United States Patent
Joshi et al.

(10) Patent No.: US 10,860,545 B2
(45) Date of Patent: Dec. 8, 2020

(54) MEASURING USAGE OF COMPUTING RESOURCES

(71) Applicant: Microsoft Technology Licensing, LLC, Redmond, WA (US)

(72) Inventors: Ashutosh Joshi, Sammamish, WA (US); Giuseppe Zingales, Seattle, WA (US); Yu Tan, Redmond, WA (US); Ullattil Shaji, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 15/468,150

(22) Filed: Mar. 24, 2017

(65) Prior Publication Data

US 2018/0276240 A1  Sep. 27, 2018

(51) Int. Cl.
*G06F 16/182* (2019.01)
*G06F 16/11* (2019.01)

(52) U.S. Cl.
CPC .......... *G06F 16/184* (2019.01); *G06F 16/122* (2019.01)

(58) Field of Classification Search
None
See application file for complete search history.

(56) References Cited

U.S. PATENT DOCUMENTS

| | | | |
|---|---|---|---|
| 7,085,825 B1 | 8/2006 | Pishevar et al. | |
| 7,243,145 B1 * | 7/2007 | Poortman | G06F 11/3419 709/221 |
| 7,487,121 B2 | 2/2009 | Swarna et al. | |
| 7,908,358 B1 | 3/2011 | Prasad et al. | |
| 8,171,545 B1 | 5/2012 | Cooley et al. | |
| 8,190,500 B2 | 5/2012 | Jakilinki et al. | |
| 8,230,059 B1 | 7/2012 | Santos et al. | |
| 8,294,593 B2 | 10/2012 | Behrendt et al. | |
| 8,463,617 B2 | 6/2013 | Ranous et al. | |
| 8,738,790 B2 | 5/2014 | Agarwal et al. | |

(Continued)

OTHER PUBLICATIONS

Meiers, Jason, "Cloud metering and billing", http://www.ibm.com/developerworks/cloud/library/cl-cloudmetering/, Published on: Aug. 8, 2011, 1-8 pages.

(Continued)

*Primary Examiner* — Hau H Hoang
*Assistant Examiner* — Hau Hoang
(74) *Attorney, Agent, or Firm* — Alleman Hall Creasman & Tuttle LLP

(57) ABSTRACT

To measure usage of computing resources on a computer, a logging service running on the computer generates event data. The computer transmits the event data to an event processing system. With a large number of computers, each computer transmits its event data to the event processing system. The event processing system stores the event data in a storage system as a file system object, such as a stream or file, in which different data fields of the received event data are stored in a structured or semi-structured manner. The event data can be processed in parallel on different pivots using map-reduce operations. Such processing can include, but is not limited to, de-duplicating event data, aggregating event data related to a resource into measurements of usage of that resource, and grouping original data or aggregated data by user or group of user for further analysis and reporting.

18 Claims, 8 Drawing Sheets

(56) References Cited

U.S. PATENT DOCUMENTS

| | | |
|---|---|---|
| 8,782,192 B2 | 7/2014 | Morgan |
| 8,799,399 B2 | 8/2014 | Agrawal et al. |
| 8,838,488 B1 | 9/2014 | Breau et al. |
| 8,898,078 B2 | 11/2014 | Pearson et al. |
| 8,924,361 B2 | 12/2014 | Rehman |
| 8,959,221 B2 | 2/2015 | Morgan |
| 8,965,801 B2 | 2/2015 | Yu et al. |
| 9,069,599 B2 | 6/2015 | Martinez et al. |
| 9,128,899 B1 | 9/2015 | McAlister |
| 9,154,539 B2 | 10/2015 | Balasubramanian et al. |
| 9,306,868 B2 | 4/2016 | Ferris et al. |
| 9,317,395 B2 | 4/2016 | Wood et al. |
| 9,354,963 B2 | 5/2016 | Ranganathan et al. |
| 9,390,128 B1* | 7/2016 | Seetala ............. G06F 16/24524 |
| 9,473,374 B2 | 10/2016 | Beaty et al. |
| 2004/0015497 A1 | 1/2004 | Swarna et al. |
| 2004/0039809 A1 | 2/2004 | Ranous et al. |
| 2004/0260652 A1 | 12/2004 | Rose |
| 2004/0267897 A1 | 12/2004 | Hill et al. |
| 2008/0155092 A1 | 6/2008 | Kumar et al. |
| 2008/0204271 A1 | 8/2008 | Behrendt et al. |
| 2010/0015926 A1 | 1/2010 | Luff |
| 2011/0055385 A1 | 3/2011 | Tung et al. |
| 2011/0145094 A1 | 6/2011 | Dawson et al. |
| 2011/0213687 A1 | 9/2011 | Ferris et al. |
| 2011/0288974 A1 | 11/2011 | Pearson et al. |
| 2012/0087319 A1 | 4/2012 | Raleigh et al. |
| 2012/0116937 A1 | 5/2012 | Van Biljon et al. |
| 2012/0131194 A1 | 5/2012 | Morgan |
| 2012/0166401 A1 | 6/2012 | Li et al. |
| 2012/0254000 A1 | 10/2012 | Ryzhikov et al. |
| 2013/0007265 A1 | 1/2013 | Benedetti et al. |
| 2013/0124720 A1 | 5/2013 | Wood et al. |
| 2013/0179476 A1 | 7/2013 | Saam et al. |
| 2014/0032531 A1 | 1/2014 | Ravi et al. |
| 2014/0059056 A1 | 2/2014 | Chaney et al. |
| 2014/0297491 A1 | 10/2014 | Cao et al. |
| 2015/0039744 A1 | 2/2015 | Niazi et al. |
| 2015/0066718 A1 | 3/2015 | Naseh et al. |
| 2015/0067142 A1 | 3/2015 | Renkema |
| 2015/0113539 A1 | 4/2015 | Agarwal et al. |
| 2015/0206207 A1 | 7/2015 | Narasimhan et al. |
| 2015/0242262 A1 | 8/2015 | Ranganathan et al. |
| 2015/0244600 A1 | 8/2015 | Ranganathan |
| 2015/0304240 A1 | 10/2015 | Mandaleeka et al. |
| 2015/0327042 A1 | 11/2015 | Kempf et al. |
| 2016/0012251 A1 | 1/2016 | Singh |
| 2016/0085792 A1 | 3/2016 | Dukes et al. |
| 2016/0094410 A1 | 3/2016 | Anwar et al. |
| 2016/0132309 A1 | 5/2016 | Rajasekhar et al. |
| 2016/0155141 A1 | 6/2016 | Song et al. |
| 2016/0179488 A1* | 6/2016 | Raman .................. G06F 16/164 717/158 |
| 2016/0182334 A1 | 6/2016 | Beaty et al. |
| 2016/0212064 A1 | 7/2016 | Biswas et al. |
| 2016/0277532 A1* | 9/2016 | Lee ....................... H04L 67/322 |
| 2016/0359872 A1 | 12/2016 | Yadav et al. |
| 2017/0201574 A1 | 7/2017 | Luo |
| 2017/0329660 A1 | 11/2017 | Salunke et al. |

OTHER PUBLICATIONS

"Say Goodbye to Manual Data Aggregation and Reconciliation", http://clearwater-analytics.com/corporations/solutions/accurate-timely-investment-data/reconciliation, Retrieved on: Oct. 21, 2016, 2 pages.

Kasap, Mustafa, "Azure Usage and Billing Insights (AUBI) Portal", https://github.com/Microsoft/AzureUsageAndBillingPortal, Published on: Printed Aug. 12, 2016, 2 pages.

Wang, et al., "Distributed Systems Meet Economics: Pricing in the Cloud", In Proceedings of 2nd USENIX Workshop on Hot Topics in Cloud Computing, Jun. 22, 2010, 7 pages.

"Cloud Computing: Cloud Pricing Models—Part 4", http://cloudtweaks.com/2012/04/cloud-computing-cloud-pricing-models-part-4/, Published on: Apr. 18, 2012, 9 pages.

"How do you pay for AWS?", https://aws.amazon.com/pricing/, Retrieved on: Dec. 7, 2016, 5 pages.

"Consumption-based pricing model", http://searchcloudapplications.techtarget.com/definition/consumption-based-pricing-model, Published on: May 2002, 3 pages.

"Final Office Action Issued in U.S. Appl. No. 15/468,140", dated Aug. 14, 2019, 23 Pages.

"Non Final Office Action Issued in U.S. Appl. No. 15/468,140", dated Dec. 27, 2019, 14 Pages.

"Non Final Office Action Issued in U.S. Appl. No. 15/468,140", dated Mar. 7, 2019, 23 Pages.

* cited by examiner

Usage Event - 300

System Data – 302
    Type – 310
    Date/Time stamp – 312
    ...
Usage measurement data – 304
    Usage ID – 320
    ReportingID – 322
    Usage Time – 324
    Usage Value – 326
    Resource data – 327
        ResourceID - 328
        Type - 330
        Subtype – 332
        Source Region – 334
        Destination Region – 335
        Unit Type - 336
    ...
Custom Data – 306
    Purchase order information – 344
    Keywords or Tags - 346
    Unstructured Text – 340
    Project – 342
    ...

FIG.3

Deduplicated Usage Events – 600

| EventID | Subscription | Resource | Date | Units |
|---|---|---|---|---|
| EventID1 | Subs1 | R1 | 2016/09/01 | 3 |
| EventID2 | Subs2 | R2 | 2016/09/01 | 5 |
| EventID3 | Subs1 | R1 | 2016/09/01 | 5 |
| EventID4 | Subs1 | R2 | 2016/09/01 | 1 |
| EventID5 | Subs3 | R1 | 2016/09/01 | 3 |
| EventID6 | Subs2 | R2 | 2016/09/01 | 7 |

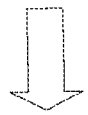

Aggregated Usage Events – 606

| Aggregated EventID | Subscription | Resource | Date | Units | RawEventIDs |
|---|---|---|---|---|---|
| AgEventID1 | Subs1 | R1 | 2016/09/01 | 8 | EventID1, EventID3 |
| AgEventID2 | Subs1 | R2 | 2016/09/01 | 1 | EventID4 |
| AgEventID3 | Subs2 | R2 | 2016/09/01 | 12 | EventID2, EventID6 |
| AgEventID4 | Subs3 | R1 | 2016/09/01 | 3 | EventID5 |

MEASURING USAGE OF COMPUTING RESOURCES

BACKGROUND

One of the challenges in providing cloud computing resources as a service to computer users is measuring usage of those computing resources by the users. Computing resources can include processing resources, application resources, storage resources and/or network resources. A user, or a group of users, generally is permitted to use the computing resources within specified limits and/or is billed based on actual usage.

Measuring usage of a computing resource, such as processing time, application usage, storage consumption and network resource utilization. involves detecting when usage begins, a user associated with that usage, a type or other characteristics of that usage, and detecting when that usage ends. Such measurements can impact the quality of the usage experienced by the user. Also, in a large computer system, such measurements can result in generation of a large amount of data to be processed.

SUMMARY

This Summary is provided to introduce a selection of concepts in a simplified form that are further described below in the Detailed Description. This Summary is intended neither to identify key or essential features, nor to limit the scope, of the claimed subject matter.

To measure usage of computing resources on a computer, a logging service running on the computer generates event data. The computer transmits the event data to an event processing system. In typical installations with many computers, each computer transmits its event data to the event processing system. The event processing system receives event data from multiple computers and stores the event data in a storage system as a file system object, such as a stream or file, in which different data fields of the received event data are stored in a structured or semi-structured manner. Using such a storage system, various processing can be performed on the event data in parallel on different pivots using map-reduce operations. Such processing can include, but is not limited to, de-duplicating event data, aggregating event data related to a resource into measurements of usage of that resource, and grouping original data or aggregated data by user or group of user for further analysis and reporting. Aggregated event data, and results of analysis and reporting performed on the original or aggregated event data, can be further stored in the storage system as streams or files in a structured or semi-structured manner for further analysis.

The event data generated by the logging service include a stream of data representing the state of the computing resources over time. In one implementation, an instance of event data in this stream of data, from a particular point in time, can be considered a snapshot of a current state of a computing resource at the time the instance of event data is captured. By taking a snapshot of the current state of the computing resource, event data can be captured with less impact on the usage of the computer resource.

The event data includes, for each instance of event data (also called a usage event), at least data indicating a time at which the usage event was captured, data indicating the computing resource, and data indicating a user or group of users. The event data can include various other data. The data indicating a resource can be used to aggregate data about usage of that resource during a period of time. Such aggregation of usage events into usage of a resource reduces subsequent processing performed on data about usage of resources. The data indicating a user or group of users can be used to group related original usage events and/or related aggregated usage data together to allow parallel processing of unrelated usage data for various analyses. Such analyses can be performed periodically, with results stored in the same storage system, and in a similar manner, as the original data and aggregated data.

In the following description, reference is made to the accompanying drawings which form a part hereof, and in which are shown, by way of illustration, specific example implementations. Other implementations may be made without departing from the scope of the disclosure.

BRIEF DESCRIPTION OF THE DRAWINGS

FIG. 3 is an illustrative diagram of a data structure representing a usage event.

FIGS. 6A and 6B provide an illustrative example of aggregation of usage events.

DETAILED DESCRIPTION

Figure 1:
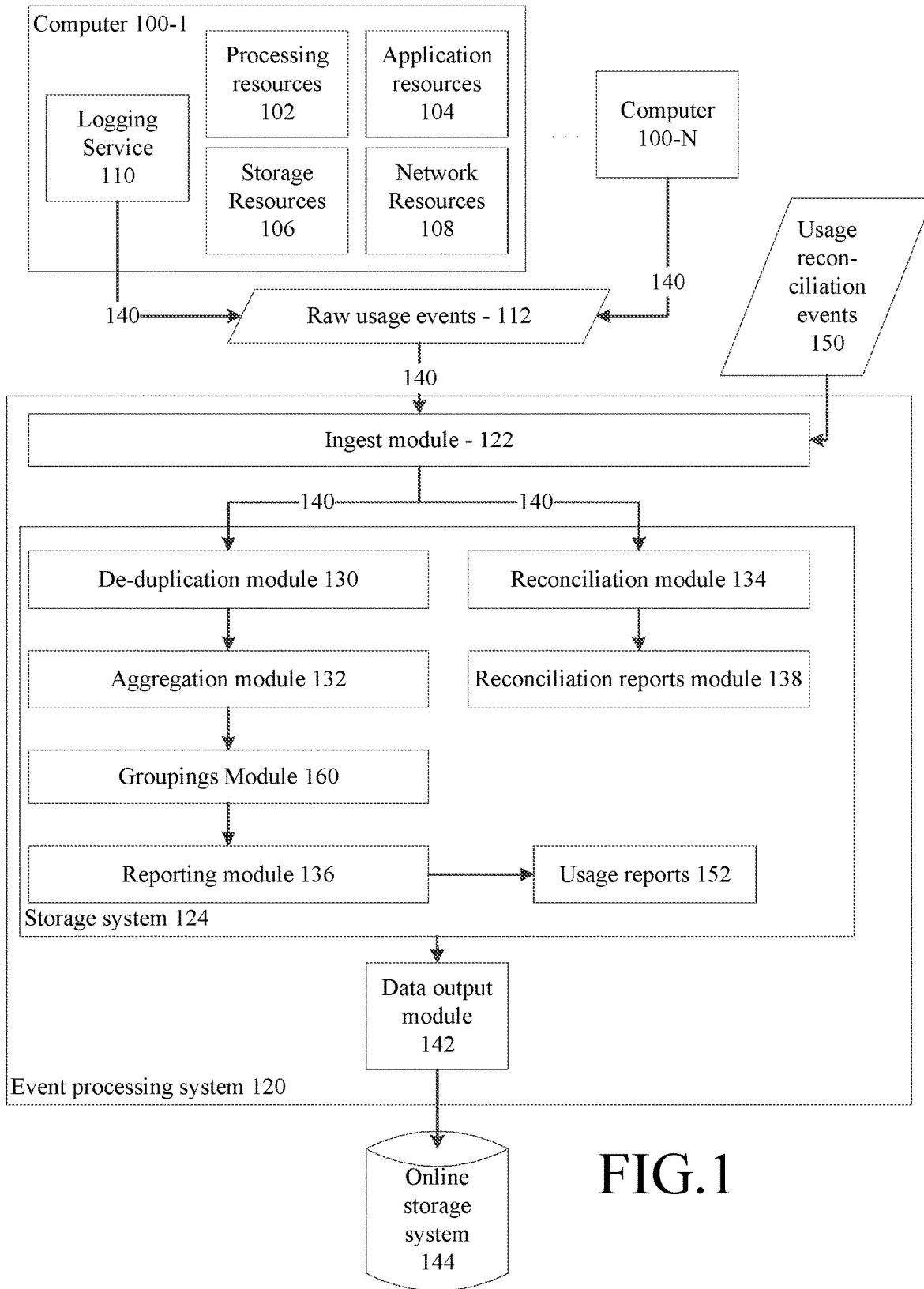
FIG. 1 is a block diagram of an example implementation of a computer system for measuring usage of computing resources.

FIG. 1 illustrates an example of a computer system for measuring usage of computing resources by capturing event data at the computing resources and transmitting the event data to an event processing system including a storage system as described herein.

FIG. 1 shows a plurality of computers 100-1, . . . , 100-N (hereinafter, whether collectively or individual, "computer 100"). A computer 100 includes computing resources such as processing resources 102, application resources 104, storage resources 106 and/or network resources 108. A computer 100 can be implemented using a general-purpose computer, such as described below in connection with FIG. 2.

A computer 100 includes a logging service 110, which is a process executing on the computer that generates event data 112. The event data generated by the logging service include a stream of data representing the state of the computing resources over time. In one implementation, an instance of event data in this stream of data, from a particular point in time, can be considered a snapshot, of a current state of a computing resource at the time the instance of event data is captured. By taking a snapshot of the current state of the computing resource, event data can be captured with less impact on the usage of the computer resource. An example implementation of a data structure for usage events is described in more detail below in connection with FIG. 3.

The computer 100 transmits the event data 112 to an event processing system 120 over a computer network 140. In typical installations with a large number of computers, each computer transmits its event data over computer network 140 to one or more ingest modules 122 of an event processing system 120.

The computer network(s) 140 can be any computer network supporting interaction between the end user computers and the shared storage system, such as a local area network or a wide area network, whether private and/or publicly accessible, and can include wired and/or wireless connectivity. The computer network can be implemented using any of a number of available network communication protocols, including but not limited to Ethernet and TCP/IP.

The event processing system 120 includes an ingest module 122 having an input receiving the event data 112 from multiple computers 100. The ingestion module stores the event data into a storage system 124. An example implementation of the storage system 124 is described in more detail below.

The storage system 124 includes both computer storage (not shown) and services that can be used to process data stored in the computer storage. Such services, as shown in FIG. 1, can include a de-duplication module 130 for de-duplicating event data, and a usage aggregation module 132 for aggregating event data into aggregated event data for a resource. The system can include a usage reconciliation module 134 for reconciling stored event data with data about received event data in response to reconciliation event data 150, and a reconciliation report module 138 for reporting about usage event reconciliation. The system also can include one or more reporting modules 136 to generate usage reports 152. The reporting modules may be run in parallel to process different groupings of the data, as generated by the grouping module 160. Example implementations of such services are also described in more detail below.

The event processing system 120 also can include a data output module 142 which reads data from the storage system 124 and places that data in a "online" storage system 144. The online storage system can provide mechanisms for users to interactively access data to perform various analytical and reporting functions.

Figure 2:
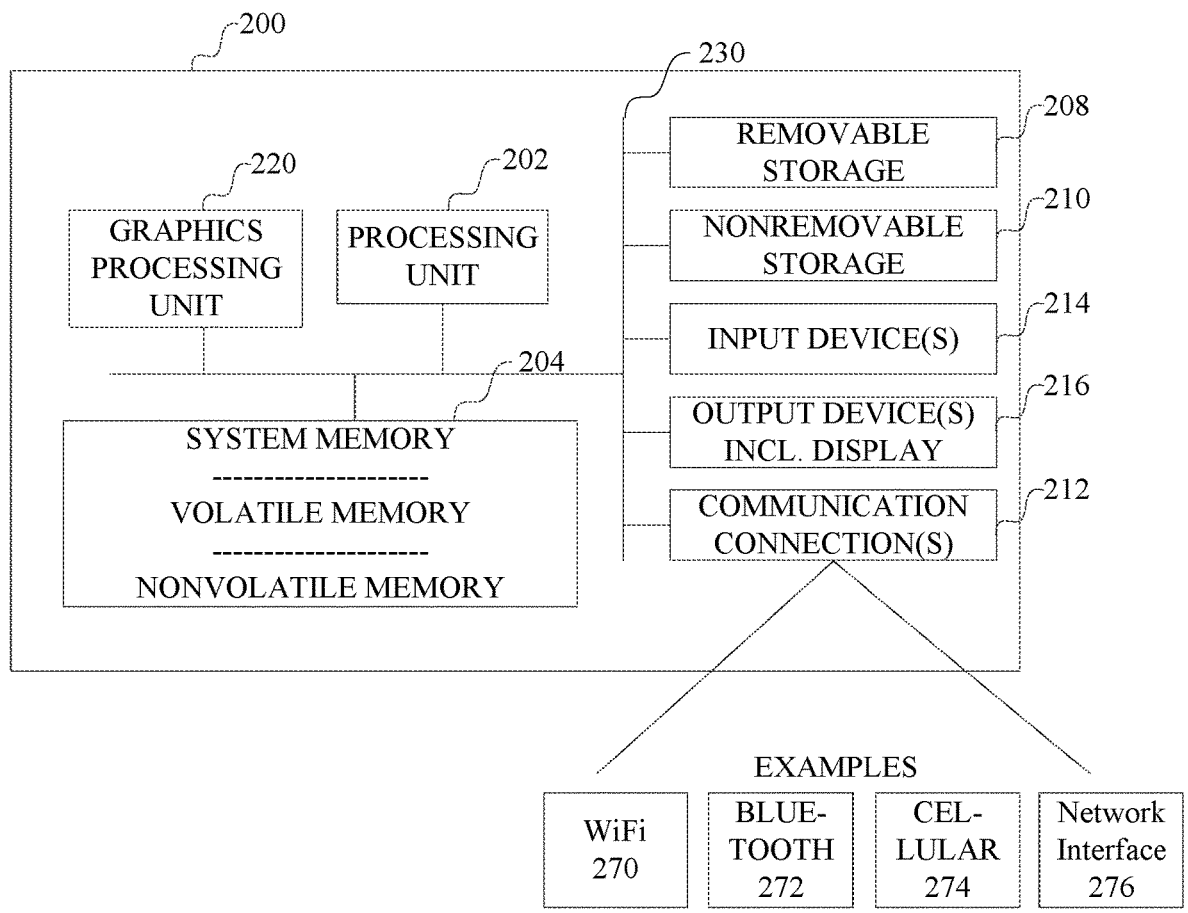
FIG. 2 is a block diagram of an example computer.

FIG. 2 illustrates an example of a computer with which techniques described herein can be implemented, whether as a kind of computing resource to be monitored, or as a computer on which the event processing system or online storage system can be implemented.

FIG. 2 illustrates only one example of a computer and is not intended to suggest any limitation as to the scope of use or functionality of such a computer. The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones including but not limited to "smart" phones, personal data assistants, voice recorders), server computers, multi-processor systems, microprocessor-based systems, programmable consumer electronics, networked personal computers, minicomputers, mainframe computers, and distributed computing environments that include any of the above types of computers or devices, and the like. In a cloud computing environment, the computing resources for which usage is measured generally are server computers with multiple processors and other resources which are configured to be accessed by multiple users.

With reference to FIG. 2, a computer 200 includes a processing system comprising at least one processing unit 202 and at least one memory 204. The processing unit 202 can include multiple processing devices; the memory 204 can include multiple memory devices. A processing unit 202 comprises a processor which is logic circuitry which responds to and processes instructions to provide the functions of the computer. A processing unit can include one or more processing cores (not shown) that are multiple processors within the same logic circuitry that can operate independently of each other. Generally, one of the processing units in the computer is designated as a primary processor, typically called the central processing unit (CPU). One or more additional co-processing units, such as a graphics processing unit (GPU) or other logic devices, also can be present in the computer. A co-processing unit comprises a processor that performs operations that typically supplement operations provided by the central processing unit, such as but not limited to graphics operations and signal processing operations. Such co-processor units or other logic devices may be located within some of the other components of the computer.

The memory 204 may include volatile computer storage devices (such as dynamic random access memory (DRAM) or other random access memory device), and nonvolatile computer storage devices (such as a read-only memory, flash memory, and the like) or some combination of the two. A nonvolatile computer storage device is a computer storage device whose contents are not lost when power is removed. Other computer storage devices, such as dedicated memory or registers, also can be present in the one or more processors. The computer 200 can include additional computer storage devices (whether removable or non-removable) such as, but not limited to, magnetically-recorded or optically-recorded disks or tape. Such additional computer storage devices are illustrated in FIG. 2 by removable storage device 208 and non-removable storage device 210. Such computer storage devices 208 and 210 typically are nonvolatile storage devices. The various components in FIG. 2 are generally interconnected by an interconnection mechanism, such as one or more buses 230.

A computer storage device is any device in which data can be stored in and retrieved from addressable physical storage locations by the computer by changing state of the device at the addressable physical storage location. A computer storage device thus can be a volatile or nonvolatile memory, or a removable or non-removable storage device. Memory 204, removable storage 208 and non-removable storage 210 are all examples of computer storage devices. Some examples of computer storage devices are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage devices and communication media are distinct categories, and both are distinct from signals propagating over communication media.

In a computer 200 example communications connection(s) 212 include, but are not limited to, a wireless communication interface for wireless connection to a computer network, and one or more radio transmitters for telephonic communications, such as over cellular telephone networks. For example, communications connections 212 allow the computer to communicate with other devices over a communication medium. Communication media transmit data, such as computer program instructions, data structures, program modules or other data, over a wired or wireless substance by propagating a modulated data signal such as a carrier wave or other transport mechanism over the substance. The term "modulated data signal" means a signal that has one or more of its characteristics set or changed in such a manner as to encode information in the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals.

Communications connections 212 are devices, such as a wired network interface, wireless network interface, radio frequency transceiver, e.g., Wi-Fi 270, cellular 274, long term evolution (LTE) or Bluetooth 272, etc., transceivers, navigation transceivers, e.g., global positioning system (GPS) or Global Navigation Satellite System (GLONASS), etc., transceivers, and network interface devices 276, e.g., Ethernet, etc., or other device, that interface with communication media to transmit data over and receive data from signal propagated over the communication media. Such connections support communication with other devices. One or more processes may be running on the computer and managed by the operating system to enable voice or data communications over such connections.

The computer 200 may have various human and machine input device(s) 214 such as a pointer device, keyboard, touch-based input device, pen, camera, microphone, sensors, such as accelerometers, gyroscopes, thermometers, light sensors and the like, and so on. The computer 200 may have various output device(s) 216 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various computer storage devices 208 and 210, communication connections 212, output devices 216 and input devices 214 can be integrated within a housing with the rest of the computer, or can be connected through various input/output interface devices on the computer, in which case the reference numbers 208, 210, 212, 214 and 216 can indicate either the interface for connection to a device or the device itself.

A computer generally includes an operating system, which is a computer program that, when executed, manages access, by other applications running on the computer, to the various resources of the computer. There may be multiple applications. The various resources include the memory, storage, input devices and output devices, such as display devices and input devices as shown in FIG. 2. To manage access to data stored in nonvolatile computer storage devices, the computer also generally includes a file system which maintains files of data. A file is a named logical construct which is defined and implemented by the file system to map a name and a sequence of logical records of data to the addressable physical locations on the computer storage device. Thus, the file system hides the physical storage locations of data from applications running on the computer, allowing applications to access data in a file using the name of the file and commands defined by the file system. A file system generally provides at least basic file operations such as creating a file, opening a file, writing a file or its attributes, reading a file or its attributes, and closing a file.

The various modules, tools, or applications, and data structures and flowcharts of FIGS. 1 and 3-8, as well as any operating system, file system and applications on a computer in FIG. 2, can be implemented using one or more processing units of one or more computers with one or more computer programs processed by the one or more processing units.

A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures. Generally speaking, such components and modules have inputs and outputs through locations in memory or processor registers from which data in such data structures can be read and to which data in such data structures can be written when the component or module is executed by the computer.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In a computer such as shown in FIG. 2, the operating system manages execution of an executable computer program as an "application" with one or more "processes". An "application" is an entity for which the computer program stores and manages state and process information in memory. The term "process" herein means a sequence of programmed instructions for which execution can be managed independently by an operating system, such as for scheduling and bindings, and for which a set of memory locations in memory 204 are allocated. A process generally cannot access the memory allocated to another process. A process has one or more threads; a thread is an independent stream of execution, which can be independently managed and scheduled on a processor, and can share memory locations in memory 204 with other threads of a same process. Different processes and threads of a same application generally can invoke operations of other processes and threads of the same application. Thus, an application, when executed, can result in multiple processes and threads being managed by the operating system. A thread also can include different frameworks for implementing parts of the application, such as different user interface frameworks within a user interface thread of the application.

The logging service 110 on a computer 100 is a process executed on the computer as part of the operating system and captures information stored by the operating system about the current state of computing resources being used on the computer. The logging service can be configured to periodically read specified data stored by the operating system about other processes running on the computer, and to package that data into event data, and transmit the event data to the event processing system. The frequency at which the logging service on a single computer generates snapshots, and thus usage events, can be configurable, such as five (5) to ten (10) or more times per hour. Thus, in a large computer system with multiple computers, the event processing system may capture several thousand usage events per second. The types of usage events to be measured also can be configurable. The logging service can receive a specification of a type of usage event to be captured, a format for the data for the usage event, and corresponding data from the operating system to be captured for that usage event.

Turning now to FIG. 3, an example data format for an instance of event data, also called a usage event, will now be described in more detail.

This example data format represents data for a usage event 300 in three parts. A first part 302 includes system data, a second part 304 includes data specific to a single usage event, called usage measurement data, and a third part 306 includes custom data, which can be customized through the logging service for a specific event data collection application.

In this example, the logging service of the operating system may be used for a wide variety of purposes, such as error logging and tracking for diagnostic purposes, in addition to usage measurement. Thus, the system data 302 includes type data 310 indicating that the data represents a usage event, to distinguish the usage event from other types of data the logging service may generate. Such data also can be used to distinguish the usage event from other types of data the recipient, e.g., ingest module 122, of the usage event also may receive. Other data in the system data 302 can include, for example, a date/time stamp 312 representing when the event data is transmitted by the logging service. The system data 302 can include yet other data (not shown) identifying the logging service, time period during which the event is sent, and event count during that time period.

The usage measurement data 304 includes data specific to a single usage event. This section 304 can include a type data field (not shown) used to distinguish a usage event from other types of events a telemetry system might receive. The usage measurement data for a single usage event shown in FIG. 3 can include, but is not limited to: a unique identifier (UsageID) 320 of the usage event, which can be a globally unique identifier (GUID); a reporting identifier (ReportingID) 322 for the usage event indicating a user or a group of users, or similar information identifying an account with which the usage is associated; a time 324 or other information indicating when the usage occurred; a usage value 326 indicating a number of units of usage of a computing resource. Other information (not shown), such as an indication of a scenario under which the resource is being used, can be stored The usage measurement data 304 also includes resource information 327 representing information about the computing resource that was used by the user, such as a resource identifier 328 and unit type information 336 indicating units for the usage value 326, such as hours, gigabytes, megabytes per second and the like. Other information about the resource can include, but is neither limited to nor required: a resource type 330 and resource subtype 332 such as a size or capacity, or other information categorizing the resource; geographic information about the resource, such as a region or data center in which the resource is located (source region 334) or accessed from (destination region 335). Yet other information can indicate a priority or tier associated with the resource. The data is the resource fields generally are stored as strings.

Custom information 306 can be configurable, and can include information such as an unstructured text field 340 for additional information, or project tracking information 342, purchase order information 344, keywords or tag data 346, and so on. Yet other information that can be stored (not shown) can include, for example, a uniform resource identifier, such as a fully qualified namespace, for the computing resource that was consumed. With this information, a usage event can be mapped back to a specific resource that was consumed.

The data representing a usage event can be stored in computer storage in a number of different formats. On the one hand, there can be one or more data structures stored in memory of the computer for which usage of computing resources is being measured. For example, the logging service may temporarily store usage event data in memory locally on the computer. Such a data structure also can be used as a file format for one or more data files for storing usage events in persistent storage on the computer until the data can be reliably transmitted to an event processing system. A file format can be and typically is different from the data structure that is stored in memory, yet both store essentially the same data.

The data structure representing a usage event as shown in FIG. 3 can be generated by the logging service. This data structure can be used to format the usage event data in a message transmitted to the event processing system. The system data 302 can be added by the logging service to the usage event data 304, 306 at the time the data is transmitted to the event processing system.

This data structure provides an extensible event schema that can be used to configure and adapt how usage of computing resources is measured. This event schema permits the logging service to identify a computing resource and an amount of the computing resource which is used, and associate that data with an entity and other user and system specified metadata. As different types of computing resources and usage models are defined for a system, the event schema allows the format for corresponding usage events to be specified.

The data structure of FIG. 3 also can be used to define the format for data in the storage system 124, as will be described in more detail below.

Figure 4:
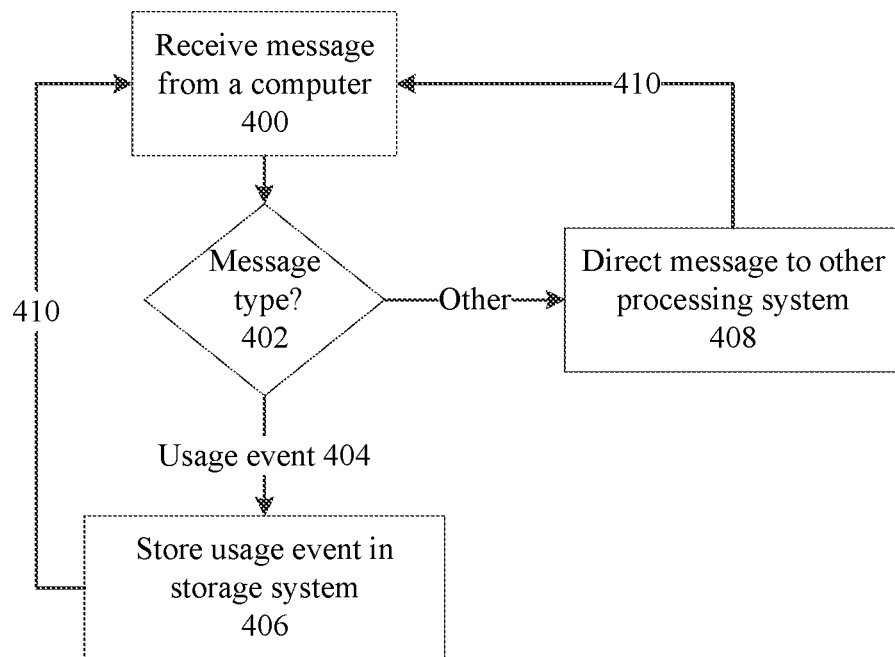
FIG. 4 is a flow chart of an example implementation of an event processing system in FIG. 1.

Turning now to FIG. 4, processing by the ingest module 122 of the event processing system will now be described in more detail. The ingest module 122 can be implemented as part of a telemetry system which receives and routes event data, among other types of data, generated by logging services on multiple computers 100, into the storage system 124. FIG. 4 is a flow chart describing an example implementation of how the ingest module 122 receives and stores data in the storage system 124.

The ingest module 122 receives 400 a message from a computer 100. In response to receiving the message, the ingest module determines 402 the message type from the message. If the message type indicates a usage event, as indicated at 404, the ingest module stores 406 the data from the usage event in the storage system 124. Other message types can be directed to other processing systems, such as diagnostic systems, as indicated at 408. This process repeats for each message processed by the ingest module as indicated at 410. For each message, the ingest module also can update its own summary event data, which it can periodically store in the storage system. Such summary event data is described in more detail below in connection with usage reconciliation.

In an example implementation, the storage system stores file system objects, such as a stream or a file, in a distributed file system, such as the distributed file system provided in a Hadoop framework. Such a framework includes a distributed file system with large file system objects and an implementation of a computational paradigm called Map/Reduce to perform operations on such file system objects. Each usage event in the event data received from the event processing system is stored in a file system object, such as a stream or file, in the storage system as an individually accessible data set or row. Each field of a usage event in the data set can be stored as a separately addressable column in the file system object. The file system object may include metadata describing the contents of each column, such as by providing a name and type for the data in the column, or the file system object may store the data as key-value pairs, or the file system object can use some other structure to represent each data set or row. The Map/Reduce computational paradigm includes operations on such data that allow the data to be clustered and sorted and otherwise processed based on specified columns, and reduces the amount of data moving across a network. By using such a file system, instead of a relational database for example, a large volume of data can be captured and stored over a period of time. Such a volume of data would quickly exceed the capacity of a typical relational database. Additionally, using such a file system enables storing usage event data in raw form, which permits more analysis of usage event data long after the events have been ingested into the storage system.

In an example implementation, a file system object called a "stream" is used. Each stream is split into "extents", where each extent can be up to 250 MB in size. Each extent is replicated for availability and reliability. Multiple additional copies of each extent can be provided for additional availability and reliability. The original usage events are continuously ingested into the storage system through the ingest module 122 and are stored as hourly streams. Every hour a new stream is generated for all the usage events in that hour. The date and the hour can be appended to the stream name. Thus, the date and hour in a usage event, i.e., its event time 312 in FIG. 3, determines the stream to which the data for that usage event is written. The event time 312 is used, instead of the usage time 324, because there can be delay between usage occurring and a usage event being transmitted describing that usage. After the data is written to a file, the file is not modified. When a file is closed for writing, the data is available for analysis through read operations on that file. An example of file names is the following, for files of usage events occurring for each hour from Sep. 1, 2016 at 0h00 to Sep. 2, 2016 at 23h00:

```
UsageEvents_2016_09_01_00.ss
UsageEvents_2016_09_01_01.ss
...
UsageEvents_2016_09_02_22.ss
UsageEvents_2016_09_02_23.ss
```

With the ingest module 122 and storage system 124, event data is continually written into a storage system in a format that allows the original event data to be processed using highly parallelizable operations on different pivots in the event data, with low latency between the data being stored and the data being available for further processing.

As shown in FIG. 1, the storage system 124 includes computation components for performing various functions on the event data stored in the storage system 124. Some example computation components will now be described in connection with FIGS. 5-8. The example components to be described below are duplicate removal, usage aggregation, usage reports generation, usage reconciliation, usage reconciliation reports generation, and parallel analyses based on groupings. Such components can be defined as batch jobs to be run at predetermined intervals on a predetermined set of the file system objects stored in the shared storage system.

One of the computation components is deduplication module 130. In the system as described above in connection with FIGS. 1-3, usage events are emitted by a distributed system, which can include a wide variety, and large number, of computers 100 communicating over a computer network. The operation of logging services on multiple diverse computers 100 in capturing data about usage events, and transmitting usage events across computer networks, can result in usage events being sent more than once. To avoid double counting usage, the deduplication module is used to ensure that usage events are processed at most once by other computation components. By collecting usage events into the storage system, a computation component of the storage system can be used to efficiently identify and reject duplicate usage events received across long periods of time.

Figure 5:
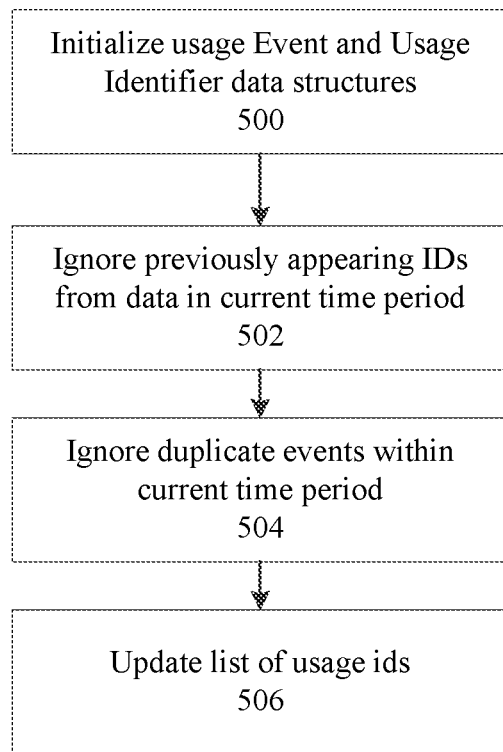
FIG. 5 is a flow chart of an example implementation of de-duplication.

FIG. 5 is a flow chart illustrating an example implementation of how usage events can be deduplicated from storage. In this example implementation, the deduplication process is performed periodically, such as every hour, as a batch job run on stored usage events. Such deduplication can be performed at the time of storage of usage events; however, performing deduplication as a batch job on stored files improves the ability of the storage system to capture usage events without delay or interruption. Further, using a batch job applied to the file system objects described above, the system can identify and ignore duplicate records using simple operations.

Each usage event is stamped with a globally unique identifier. For each usage event that is received for storage, this globally unique identifier is stored in the data set for that usage event in the file system object in the storage system. The globally unique identifier can be used to deduplicate the stored usage events. The deduplication module can search previously stored event data for any usage event having an identifier that matches the identifier of recently received usage events. Recently received usage events having identifiers that match a stored usage event can be discarded.

Because of delays between capturing usage and transmission of usage events, and the possibility of a usage event being transmitted multiple times, it is possible that duplicate usage events may reside in different file system objects in the storage system. The process described in FIG. 5 takes this possibility into account.

In FIG. 5, in one example implementation, the de-duplication begins with the file system object for a current time period, such as a current hour, and a list of usage identifiers from previous time periods. Data structures representing the current usage events from the current time period and the list of usage identifiers are initialized 500. Example pseudocode describing this initialization is the following:

usageEvents=ParseCurrentUsageEvents( );
usageIds=DataStore.LoadAllUsageIds( );

This example process creates a new file system object from a file system object for a current time period by first ignoring (502) usage events having a usage identifier that has already appeared in file system objects from previous time periods. A "left outer join" operation can be used to select, from the usage events of the current time period, only those usage events with unique usage identifiers. Example pseudocode describing this operation is the following:

```
dedupedUsagesById =
    SELECT usageEvents.*
    FROM usageEvents
    LEFT OUTER JOIN usageIds
    ON usageEvents.UsageId == usageIds.UsageId
    WHERE usageIds.UsageId == null;
```

Next, this example de-duplication process ignores 504 usage events for the current time period that have the same usage identifier. In one example, each usage event that has a unique combination of reporting identifier, partner identifier and usage identifier can be selected and retained as a de-duplicated usage record for the current time period. Example pseudocode describing this operation is the following:

```
dedupedUsages =
    SELECT DISTINCT
        ReportingId,
        UsageId,
        FIRST(ResourceId) AS ResourceId,
        FIRST(ResourceType) AS ResourceType,
        <other columns omitted for clarity>
    FROM dedupedUsagesById;
```

The set of usage identifiers that have already appeared then is updated 506 to include the usage identifiers from the file system object for the current time period. Example pseudocode describing this operation is the following:

```
updatedUsageIds = SELECT UsageId, @endDate AS InsertedTime
FROM dedupedUsages;
DataStore.SaveUsageIds(updatedUsageIds);
```

Another type of processing performed in the storage system is usage event aggregation, as shown by the aggregation module 132 in FIG. 1. The logging services of multiple computers can emit usage events at a very high frequency. When usage events are snapshots, indicating that a particular usage occurred at a particular time, usage events for the same resource, user or group of users, and usage date, in the same time period such as each hour, are processed into an aggregate measure of usage of that resource. The aggregate results are stored in the storage system as another file system object. Providing aggregated event data can reduce the amount of data loaded for subsequent processing, e.g., by reporting modules 136

An illustrative example of such aggregation is shown in FIG. 6A. As can be seen in the deduplicated usage events 600 in FIG. 6A, EventId1 and EventId3 each refer to the same subscription ("Subs1") (i.e., user or group of users) and to the same resource ("R1"). Thus, these usage events can be aggregated into an aggregated event (AgEventId1), and the usage units of these usage events are summed, as indicate at 602. Some events, e.g., EventId4, have no other similar entries, however, an aggregate event is still created, as indicated at 604. The mapping of the aggregated event identifiers (AgEventId) to original event identifiers (RawEventId) can be retained for each aggregated event. As a result of this aggregation operation, another file system object is created in the storage system 124 representing the aggregated event data 606. The aggregated event data can have fewer columns than the original raw data, and fewer records due to the aggregation, and thus is a smaller data set for processing.

Figure 6B:
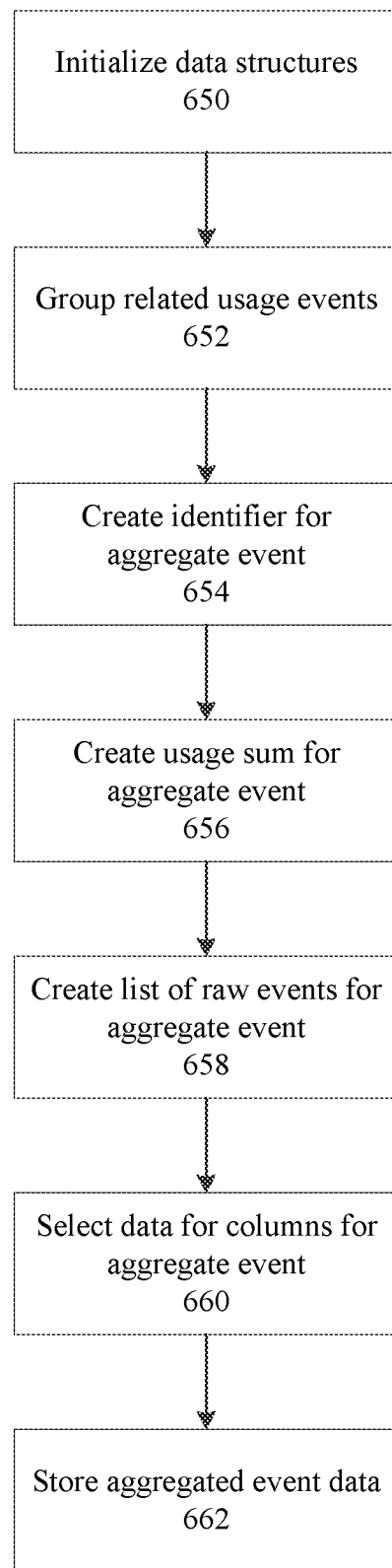

A flow chart describing an example implementation of such aggregation will now be described in connection with FIG. 6B. In FIG. 6B, a data structures are initialized 650. For example, a data structure representing a set of usage events to be aggregated, is initialized. For example, usage events within a defined date and time range, such as a selected hour of a selected day, can be selected. Another data structure, representing the set of aggregated usage events, is initialized. The selected usage events are then processed, by grouping 652 related usage events based on a combination of values, such as those with the same resource identifier, date, reporting identifier and partner identifier. For each set of grouped usage events, a new row of data is added to the aggregate usage event by creating 654 an identifier for the aggregate event, summing 656 the usage units across the group, creating 658 a list of the identifiers of the usage events in the group, and otherwise selecting 660 certain columns of the original raw usage event data. The aggregated event data can be stored 662 as a file system object in the data storage system.

Example pseudocode describing this operation is the following:

```
usageEvents =
DataStore.LoadExtractedUsage(dataPathPrefix=@usagePathPrefix,
startDate=@startDate, endDate=@endDate);
aggregateUsages =
    SELECT
        NewId( ) AS AggregatedUsageId,
        ReportingId,
        PartnerId,
        ResourceId,
        SUM(Units) AS Units,
        UsageDate,
        IngestDate,
        string.Join(",", LIST(UsageId).OrderBy(item =>
item).ToArray( ) ) AS RawUsageIds
    FROM usageEventsWithUsageDate
    GROUP BY ReportingId, PartnerId, ResourceId, UsageDate,
    IngestDate;
```

The storage system (124, FIG. 1) also can include a computation component which is run periodically to check for event loss and inconsistency, as indicated by a usage reconciliation module 134 in FIG. 1. Such a module compares two streams of information about usage events. The first stream is the raw event data, i.e., the stream of actual usage events containing information such as event identifiers, subscription, resource, usage date, units, etc. The second stream is usage reconciliation events 150 (FIG. 1). These events are summary events containing information, such as event count and event identifiers, generated by and received from the ingest module 122 (FIG. 1). Such summary events also can be stored as a file system object in the storage system 124.

These two streams can have their own latency independently, so the usage reconciliation module 134 looks at past data as stored in the storage system. In one implementation, a comparison window and a scanning window can be used and can be configurable parameters for the reconciliation module. The scanning window is a period of time before the start time of the reconciliation process. The comparison window is a period of time within the scanning window from which events are actually compared, based on their event time. The scanning window and comparison windows can be separately adjusted to provide a desired quality assurance metric and to factor in the latency of the two data streams.

Figure 7:
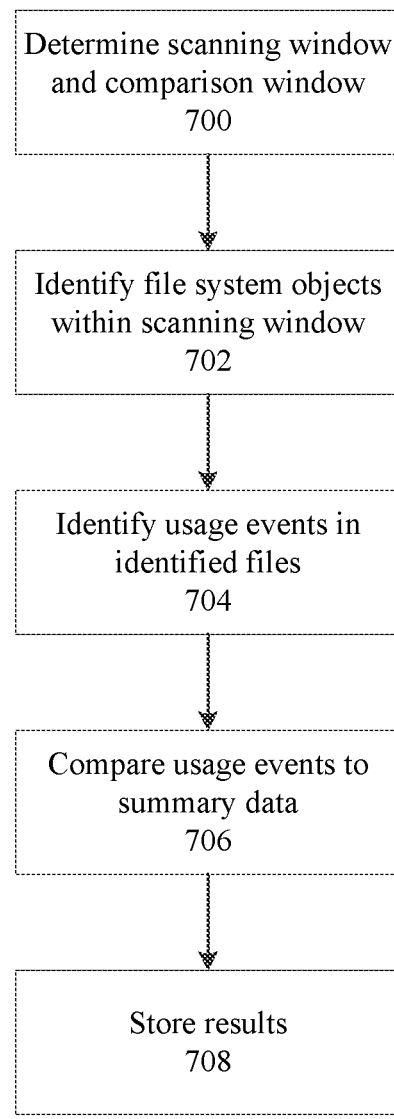
FIG. 7 is a flow chart describing an example implementation of a reconciliation module.

Referring now to FIG. 7, the reconciliation module determines 700 data defining the comparison window and the scanning window. The reconciliation module identifies 702 file system objects generated and stored in the scanning window for both usage events and summary data. The reconciliation module the searches 704 within the identified file system objects for usage events in the comparison window. The reconciliation module then compares 706 the identified usage events to the identified summary data. For example, as shown in the pseudocode below, the count of the events based on the summary data is compared to the count of the stored usage events. If the counts do not match, then the event identifiers that are in the reported events from the summary, but not in the stored events, are identified. Results of such comparison can be stored 708, or communicated to a system administrator, for example.

Some example pseudocode describing an implementation of this operation is the following. First a stream of the stored usage events is identified and the number of events is counted.

```
// loading received usage events
aStream = LoadUsageEvents( );
// Get the received event Ids and counts
receivedEvent =
    SELECT DISTINCT UsageId AS EventId
    FROM aStream;
countA =
    SELECT
        COUNT(1) AS EventCount,
        COUNT(DISTINCT UsageId) AS DistinctEventCount
    FROM aStream;
```

Similarly, a stream of the usage events from the summary of events is identified and the number of events is counted:

```
// loading summary events
bStream = DataStore.LoadExtractedUsageEventReconEntry( );
// Get the reported event Id and counts from summary
reportedEvent =
    SELECT DISTINCT EventId
    FROM bStream
    CROSS APPLY Events.Split(',') AS EventId
    WHERE EpochSentTime >= @dataReconWindowStart AND
EpochSentTime < @dataReconWindowEnd;
reportedCount =
    SELECT SUM(EventCount) AS EventCount
    FROM bStream
    WHERE EpochSentTime >= @dataReconWindowStart AND
EpochSentTime < @dataReconWindowEnd;
```

Next, the event counts in the two streams are compared. If a mismatch occurs, the identifiers of the missing events are determined:

```
// Compare the event counts and save the count results
usageEventReconResult =
    SELECT
        @dataCollectionWindowEnd AS ReconRunHour,
        @dataReconWindowStart AS ReconWindowStart,
        @dataReconWindowEnd AS ReconWindowEnd,
        countA.EventCount AS EventCount,
        reportedCount.EventCount AS EventSumFromStats,
        countA.DistinctEventCount AS DistinctEventCount
    FROM countA CROSS JOIN reportedCount;
DataStore.SaveReconOutput_UsageEvent(usageEventReconResult);
// Get the missing usage events Ids (The event Ids that are in the reported
events from the summary but not in the received events) and save the
results
discrepancy =
    SELECT
        receivedEvent.EventId AS ReceivedUsageEvent,
        reportedEvent.EventId AS ReportedUsageEvent
    FROM receivedEvent
    FULL OUTER JOIN reportedEvent
    ON receivedEvent.EventId == reportedEvent.EventId
    WHERE receivedEvent.EventId == NULL;
DataStore.SaveReconOutput_UsageEvent_Discrepancy(discrepancy);
```

The result of comparing the original usage events as stored with the summary data, by periodically executing the reconciliation module, can be another file system object in the storage system. This file system object can store reconciliation data (indicated as usage reconciliation reports 138 in FIG. 1) that can indicate: a total number of events reported in the summary data, the total number of events actually recorded in the raw event data, any missing events, and any mismatched event identifiers.

The storage system 124 also can support a wide variety of reporting modules 136 that process the data stored in the storage system. In one example, to be described now in connection with FIG. 8, the reporting module 136 can process data into groups and then process data for different groups in parallel. Such processing can be performed for billing purposes, but also any other analytics of the usage data can be performed by first applying groupings, and then analyzing data in different groups in parallel.

Figure 8:
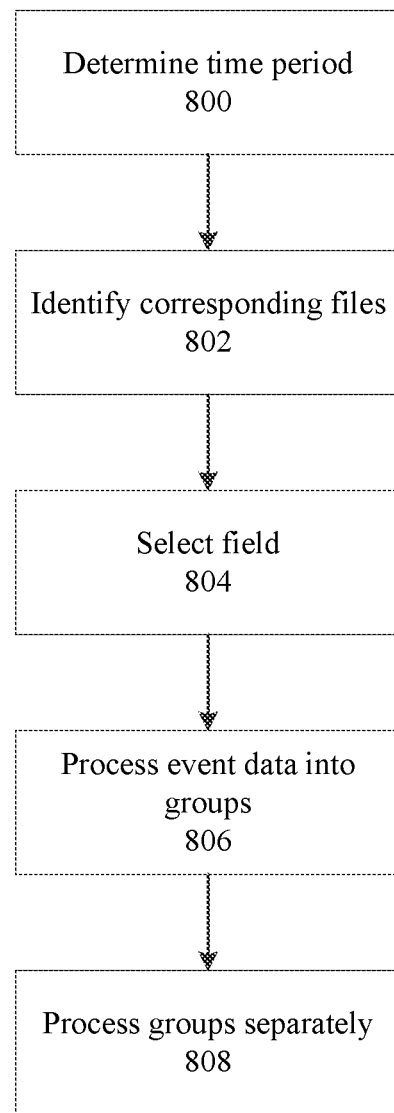
FIG. 8 is a flow chart describing an example implementation of a reporting module.

As shown in FIG. 8, a reporting module determines 800 a time period from which data is to be processed. The reporting module uses this time period to select 802 file system objects in the storage system. A field on which grouping is to occur is then selected 804. A particularly useful field for grouping is the identifier of the user or group of users, such as a subscription identifier, as found in field 322 in FIG. 3. The selected file system objects are then processed, based on the selected field, into different groups of records, with each group including the records matching one or more values in the selected field. The reporting module then can process 808 each group separately, preferably in parallel.

Such grouping is particularly useful where serial processing of data occurs when processing data within the group, but where different groups otherwise can be processed in parallel. This condition can arise where there are some dependencies among the usage events in the group that impact processing those usage events. As an example, this kind of processing may arise in the context of billing for the measured usage where two (or more) different subscriptions share the same account balance. In such a circumstance, processing usage data for the two subscriptions separately and in parallel could result in access conflicts or errors, so the two subscriptions would be processed serially to ensure the correct balance is calculated. However, processing all subscriptions serially would be slow.

The following is some example pseudocode for updating account balances based on grouping usage events by subscriptions (ReportingID, 322, FIG. 3) that share the same account balance. Such subscription groups may be identified by using other metadata. For example, other metadata may relate a ReportingID with another entity, such as an organization, which may be associated with an account balance. Multiple ReportingIDs may be associated with a same account balance. For example, a ReportingID may be associated with each user of an organization and an account balance may be associated with the organization. A group, such as a subscription group, is identified by using the metadata that associates usage event data, such as a ReportingID, with other data. All usage events within a group can be processed together; different groups can be processed in parallel. Thus, multiple instances of the following pseudocode can be processed in parallel for different subscription groups:

```
SubscriptionGroup = GetSubscriptionGroup(Balance1);
CurrentBalance = ReadCurrentBalance(Balance1);
UsageConsumption = CalculateUsageConsumption(SubscriptionGroup);
RemainingBalance = CurrentBalance − UsageConsumption;
Balance1 = RemainingBalance;
```

Thus, by identifying any dependencies among usage events, those interdependent usage events can be grouped for processing. Groups that do not have dependencies with other groups can be processed in parallel.

There are several ways to find interdependencies among usage events to allow those usage events to be grouped. A general algorithm for identifying groups of usage events is described by the following example pseudocode. In this example, one field of data from the usage event data, such as a ReportingID, defines a first set of nodes. Another field of data from other metadata, such as a BalanceID for an account balance, defines a second set of nodes. Each instance of a node has an identifier, called a NodeID. Associations that associate instances of nodes, such as associations between ReportingIDs and BalanceIDs, are referred to as edges and have identifiers called EdgeIDs.

A mapping of NodeIDs to EdgeIDs is loaded, and all new NodeIds are selected:

```
    node2Edge = SELECT * FROM nodeToEdgeMapping;
    newIds =
        SELECT DISTINCT
            node2Edge.NodeId
        FROM node2Edge;
```

A group is generated for each node. Each node starts in a group containing only itself:

```
newNode2Group =
    SELECT
        NodeId,
        0L AS NodeVersion,
        Convert.ToInt64(string.Format("{0}{1:D10}", Iteration,
    Math.Abs(NodeId.GetHashCode( )) ) ) AS Group,
        0L AS Iteration
    FROM newIds;
```

A mapping of nodeID to NodeId is then generated. In the following, this mapping includes a mapping of a node from itself to itself:

```
    newNode2Node =
        SELECT DISTINCT node2Edge.NodeId AS Left,
            newNode2EdgeClone.NodeId AS Right
        FROM node2Edge
        INNER JOIN node2Edge AS newNode2EdgeClone
            ON node2Edge.Edge == newNode2EdgeClone.Edge;
Grouping_Loop:
    Node2Group = SELECT * FROM newNode2Group;
    Node2Node = SELECT * FROM newNode2Node;
    Node2Node =
        SELECT * FROM Node2Node
            UNION DISTINCT
        //Make List symmetric
        SELECT Right AS Left, Left AS Right FROM Node2Node
            UNION DISTINCT
        // Add Nodes point to self.
        SELECT Left, Left AS Right FROM Node2Node
            UNION DISTINCT
        // Add Right nodes to point to self
        SELECT Right AS Left, Right FROM Node2Node;
```

Next, given a node, a mapping of its left node to the minimum of the groups of its neighboring nodes is obtained:

```
NodeToNeighborToGroup =
    SELECT Node2Node.Left,
        Node2Node.Right,
        Node2Group.Group,
        Node2Group.EffectiveDate,
        Node2Group.NodeVersion,
        Node2Group.Iteration
    FROM Node2Node
    INNER JOIN Node2Group
        ON Node2Node.Right == Node2Group.NodeId;
```

Then, for each node x, the minimum of the group of all of its neighbors in then obtained:

```
minimumOfMyNeighbors =
    SELECT Left AS NodeId,
        ARGNIN(Group, Right) AS MinimumNeighbor,
        MIN(Group) AS Group,
        MAX(Iteration) AS Iteration
    FROM NodeToNeighborToGroup
    GROUP BY NodeId; // compared with itself as well
newNode2Node =
    SELECT minimumOfMyNeighbors.MinimumNeighbor AS Left,
        Right
    FROM Node2Node
    INNER JOIN minimumOfMyNeighbors
        ON Node2Node.Left == minimumOfMyNeighbors.NodeId
    UNION DISTINCT
    SELECT NodeId AS Left,
        MinimumNeighbor AS Right
    FROM minimumOfMyNeighbors;
newNode2Group =
    SELECT minimumOfMyNeighbors.NodeId AS NodeId,
        minimumOfMyNeighbors.Group,
        minimumOfMyNeighbors.EffectiveDate,
        Node2Group.NodeVersion + 1 AS NodeVersion,
        minimumOfMyNeighbors.Iteration
    FROM minimumOfMyNeighbors
    INNER JOIN Node2Group
        ON Node2Group.NodeId == minimumOfMyNeighbors.NodeId;
newNode2Group = SELECT DISTINCT * FROM newNode2Group;
if newNode2 Group != Node2Group OR newNode2Node != Node2Node
goto Grouping_Loop
finalNode2Group = SELECT DISTINCT * FROM newNode2Group;
finalNode2Node = SELECT DISTINCT * FROM newNode2Node;
OUTPUT finalNode2Group;
OUTPUT finalNode2Node;
```

Thus, using the foregoing, usage event data can be grouped for processing based on relationships between the values in the usage event data, such a ReportingIDs, and other metadata, such as associated account balances. After such groups are identified, such groups can be processed in parallel.

In some implementations, such further processing of usage events (whether original usage events or aggregated usage events) can include generating billing or invoicing for the usage of the computing resources. After usage events are used as the basis of a charge or invoice, or other kind of processing, the corresponding usage events can be tagged as having been used. Such tagging enables the system to associate individual usage events to an invoice or other processing result. Such tagging can be used to identify usage events that are not processed by any billing system or other processing system. Such tags can be used to reduce the likelihood of a usage event being processed twice, such as double billing across multiple billing systems. Such tags also can be used to analyze processing results, such as billing charges, using different properties of the usage events. Such analyses can include, for example statistical processing such as sensitivity analyses.

By using storage system in which event data is stored in file system objects in a distributed file system with map/reduce computational capability, the system can capture original event data generated at high bandwidth, and in a scalable manner.

By using storage system in which event data is stored in file system objects in a distributed file system with map/reduce computational capability, the original event data can be aggregated and queried based on different pivots. The report modules 136 can take aggregated usage events as an input and can produce report streams that also are stored in the storage system. These report streams can be exported to the online storage (144 in FIG. 1) for more efficient querying.

Another advantage of using this event based architecture and associated storage system is that computations can be highly parallelized. Even though there can be a large number of events, the events are associated with individual entities. The processing of usage associated with these entities is highly parallelizable using the distributed file system and a map/reduce paradigm.

Also, because the original event data is stored in the storage system, additional reporting modules can be implemented to implement different aggregations and/or different analyses of the original data and/or aggregated data. The storage system allows aggregation of usage data across different pivots in a consistent manner without creating specific engineering infrastructure to enable it.

Using this storage system also enables anomaly detection and ability to automatically generate alerts based on discrepancies. The file streams can be processed to determine a typical distribution of the usage events and their associated properties. Incoming usage events can be compared to this typical distribution to generate alerts when the usage events with low probability arise in the event data.

This storage system also can maintain a large amount of the original usage event data for a long period of time. By storing the original raw data for a long period of time, any further processing based on aggregated usage events can be correlated with and traced to the corresponding original usage events.

Accordingly, in one aspect, a computer system comprises an ingest module connected to receive event data over a computer network from a plurality of computers. The event data includes usage events. Each usage event includes a plurality of fields, including data indicating a time associated with the usage event and data indicating a user or group of users associated with the usage event. A storage system stores a plurality of file system objects in a distributed file system. Each file system object includes the data from usage events received during a time period associated with the file system object. Each file system object stores each field in the plurality of fields as a separate column in the files system object. The storage system further comprises a reporting module, wherein the reporting module is operative to identify file system objects having usage events from a first period of time. Usage events from the identified file system objects are processed into groups based on at least the data in the usage event. Different groups of usage events are processed separately in parallel.

In another aspect, a computer-implemented process involves receiving event data over a computer network from a plurality of computers. The event data includes usage events, each usage event comprising a plurality of fields, including data indicating a time associated with the usage event and data indicating a user or group of users associated with the usage event. A plurality of file system objects is stored in a distributed file system. Each file system object includes the data from usage events received during a time period associated with the file system object. Each file system object stores each field in the plurality of fields as a separate column in the files system object. File system objects having usage events from a first period of time are identified. The usage events from the identified file system objects are grouped into groups based on at least the data in the usage event. Different groups of usage events can be processed separately and in parallel.

In another aspect, in a computer system that stores usage events in a plurality of file system objects in a distributed file system, wherein each file system object includes the data from usage events received during a time period associated with the file system object, and stores each field in the plurality of fields as a separate column in the files system object, the computer system includes: a means for grouping usage events based on at least data in the usage events; and means for processing different groups of usage events separately and in parallel.

In any of the foregoing aspects, the plurality of fields of a usage event can include a unique identifier of the usage event.

In any of the foregoing aspects, the storage system can include a deduplication module. The deduplication module can identify any usage events in one or more file system objects having a matching unique identifier. A file system object without duplicate usage events can be generated.

In any of the foregoing aspects, the storage system can include an aggregation module. The aggregation module can identify file system objects corresponding to a first period of time, identify usage events in the identified file system objects having a same resource identifier, and aggregate usage information associated with the identified usage events. A file system object including the aggregated usage information can be created. In some aspects, the first period of time can be greater than the second period of time.

In any of the foregoing aspects, usage events can be processed into groups based on a relationship among users for the usage events identified by other metadata.

In any of the foregoing aspects, a usage event can include data indicating a computing resource associated with the usage event.

The various aspects of such a computer system can be embodied in an article of manufacture includes at least one computer storage device, and computer program instructions stored on the at least one computer storage device. The computer program instructions, when processed by a processing system of a computer, the processing system comprising one or more processing units and memory accessible by threads executed by the processing system, and having a system timer, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer system comprising:
    an ingest module configured to receive event data over a computer network from a plurality of computers, the event data including usage events, each usage event comprising a plurality of fields, including a time associated with the usage event and a user or group of users associated with the usage event;
    a storage system storing a plurality of file system objects in a distributed file system, each file system object including data from usage events received during a time period associated with the file system object, each file system object storing each field in the plurality of fields as a separate column in the file system object,
    wherein the storage system further comprises a reporting module, wherein the reporting module is operative to:
        receive an input of a first period of time and a selected field of the plurality of fields;
        identify file system objects stored in the storage system having usage events from the first period of time based on data in the usage events from the first period of time;
        retrieve the identified file system objects from the storage system;
        group usage events from the identified file system objects into groups based on the selected field; and
        separately process different groups of usage events in parallel,
        wherein a first group of usage events does not have a dependency with a second group of usage events, and wherein the first group of usage events is separately processed in parallel with the second group of usage events.

2. The computer system of claim 1, wherein the plurality of fields of a usage event further comprises:
    a unique identifier of the usage event.

3. The computer system of claim 2, wherein the storage system further comprises a deduplication module, wherein the deduplication module is operative to identify any usage events in one or more file system objects having a matching unique identifier, and generate a file system object without duplicate usage events.

4. The computer system of claim 1, wherein the storage system further comprises an aggregation module, wherein the aggregation module is operative to:
    identify usage events in the identified file system objects having a same resource identifier; and
    aggregate usage information associated with the identified usage events; and
    create file system objects including the aggregated usage information.

5. The computer system of claim 1, wherein the different groups are separately processed based on a relationship among users for the usage events identified by other metadata.

6. The computer system of claim 1, wherein each usage event includes data indicating a computing resource associated with the usage event.

7. The computer system of claim 1, wherein the reporting module is further operative to:
    identify, among the usage events, one or more interdependent usage events;
    group the one or more interdependent usage events; and
    process the one or more interdependent usage events together.

8. An article of manufacture comprising:
    an ingest module configured to receive event data over a computer network from a plurality of computers, the event data including usage events, each usage event comprising a plurality of fields, including a time associated with the usage event and a user or group of users associated with the usage event;
    a storage system storing a plurality of file system objects in a distributed file system, each file system object including data from usage events received during a time period associated with the file system object, each file system object storing each field in the plurality of fields as a separate column in the file system object,
    wherein the storage system further comprises a reporting module, wherein the reporting module is operative to:
        receive an input of a first period of time and a selected field of the plurality of fields;
        identify file system objects stored in the storage system having usage events from the first period of time based on data in the usage events from the first period of time;
        retrieve the identified file system objects from the storage system;
        group usage events from the identified file system objects into groups based on the selected field; and
        separately process different groups of usage events in parallel;
        identify, among the usage events, one or more interdependent usage events;
        group the one or more interdependent usage events; and
        process the one or more interdependent usage events together.

9. The article of manufacture of claim 8, wherein the plurality of fields of a usage event further comprises a unique identifier of the usage event.

10. The article of manufacture of claim 9, wherein the storage system further comprises a deduplication module, wherein the deduplication module is operative to identify any usage events in one or more file system objects having a matching unique identifier, and generate a file system object without duplicate usage events.

11. The article of manufacture of claim 8, wherein the storage system further comprises an aggregation module, wherein the aggregation module is operative to:
    identify usage events in the identified file system objects having a same resource identifier; and
    aggregate usage information associated with the identified usage events; and
    create file system objects including the aggregated usage information.

12. The article of manufacture of claim 8, wherein the different groups are separately processed based on a relationship among users for the usage events identified by other metadata.

13. The article of manufacture of claim 12, wherein each usage event includes data indicating a computing resource associated with the usage event.

14. A computer-implemented process, comprising:
receiving event data over a computer network from a plurality of computers, the event data including usage events, each usage event comprising a plurality of fields, including a time associated with the usage event and a user or group of users associated with the usage event;
storing a plurality of file system objects in a distributed file system, each file system object including data from usage events received during a time period associated with the file system object, each file system object storing each field in the plurality of fields as a separate column in the file system object;
receiving an input of a first period of time and a selected field of the plurality of fields;
identifying file system objects having usage events from the first period of time based on data in the usage events from the first period of time;
retrieving the identified file system objects;
grouping usage events from the identified file system objects into groups based on the selected field; and
separately processing different groups of usage events in parallel;
wherein a first group of usage events does not have a dependency with a second group of usage events, and wherein the first group of usage events is separately processed in parallel with the second group of usage events.

15. The computer implemented process of claim 14, wherein the plurality of fields of a usage event further comprises:
a unique identifier of the usage event.

16. The computer-implemented process of claim 15, further comprising:
identifying any usage events in one or more file system objects having a matching unique identifier; and
generating a file system object without duplicate usage events.

17. The computer-implemented process of claim 14, further comprising:
identifying usage events in the identified file system objects having a same resource identifier;
aggregating usage information associated with the identified usage events; and
creating file system objects including the aggregated usage information.

18. The computer-implemented process of claim 14, wherein the different groups are separately processed based on a relationship among users for the usage events identified by other metadata.

* * * * *